United States Patent [19]

Stephenson et al.

[11] 4,415,184

[45] Nov. 15, 1983

[54] HIGH TEMPERATURE INSULATED CASING

[75] Inventors: Edgar O. Stephenson; Victor R. R. Brown, both of Tacoma, Wash.

[73] Assignee: General Electric Company, Schenectady, N.Y.

[21] Appl. No.: 257,547

[22] Filed: Apr. 27, 1981

[51] Int. Cl.³ .............................................. F16L 59/14
[52] U.S. Cl. .................................... 285/47; 138/149; 285/371
[58] Field of Search .............. 285/47, 53, 371, DIG. 5; 138/149

[56] References Cited

U.S. PATENT DOCUMENTS

| | | | |
|---|---|---|---|
| 1,909,075 | 5/1933 | Ricker et al. | 138/113 |
| 2,451,146 | 10/1948 | Baker et al. | 285/47 X |
| 3,275,345 | 9/1966 | Waldron et al. | 285/47 |
| 3,280,849 | 10/1966 | Rendos et al. | 138/149 |
| 3,371,946 | 3/1968 | Bleyle, Jr. et al. | 285/47 |
| 3,387,864 | 6/1968 | Walters | 285/371 X |
| 3,402,731 | 9/1968 | Martin | 285/47 X |
| 3,476,409 | 11/1969 | Benteler et al. | 285/371 X |
| 3,511,282 | 5/1970 | Willhite et al. | 138/113 |
| 3,574,357 | 4/1971 | Alexandra et al. | 285/47 |
| 3,693,665 | 9/1972 | Veerling et al. | 285/47 X |
| 3,865,145 | 2/1975 | McKay et al. | 285/47 X |
| 3,928,903 | 12/1975 | Richardson et al. | 285/47 X |
| 4,130,031 | 12/1978 | Dunham et al. | 285/47 |
| 4,219,224 | 8/1980 | Hanley | 285/47 |
| 4,332,401 | 6/1982 | Stephenson et al. | 285/47 |
| 4,340,245 | 7/1982 | Stalder | 285/53 |

*Primary Examiner*—Thomas F. Callaghan
*Attorney, Agent, or Firm*—Robert C. Lampe, Jr.

[57] ABSTRACT

An insulated casing assembly for use in injecting steam into wells or transmitting steam from the generating source to the wellhead is disclosed. A plurality of interconnected casings are used, each casing have outer and inner tubular sections and an annular spacing between the two sections containing either multilayered thermal insulation or glass microspheres, enveloped in a low conductivity gas. Rigid thrust rings connect and prevent relative movement between the corresponding ends of the two sections. A pressure sealing ring disposed between adjacent inner tubular sections prevents ingress of steam into the coupling cavity. An insulation assembly between adjacent casings includes coupling cavity insulation fitted tightly over the thrust rings and a gap insulating ring disposed between adjacent outer tubular sections. A threaded coupling screwed onto threaded ends of outer tubular sections of adjacent casings joins them.

8 Claims, 4 Drawing Figures

HIGH TEMPERATURE INSULATED CASING

FIELD OF THE INVENTION

This invention relates generally to insulated casings for hot fluid transfer and more particularly to a new and improved insulated casing assembly for oil well steam injection or above ground steam transport which greatly reduces heat transfer between the fluid and the casing components, provides increased structural integrity and reliability, and permits the outer sections of plural casings to be repeatedly and rigidly coupled together, using standard oil field equipment without fluid leakage while the inner sections of the casings absorb the lengthwise expansion/contraction loads in response to the temperature changes of the fluid which they carry with minimal relative motions.

DESCRIPTION OF THE PRIOR ART

Casing assemblies utilized to transfer fluids downhole must be constructed so as to be structurally rigid and leakproof while being capable of cyclic response to temperature changes of the fluid flowing through them. This is particularly true when the casing assembly is used to inject very high temperature steam into an oil well. The purpose of steam injection is to lower the viscosity of heavy crude oil so that it can be pumped or forced to the surface and thus extend recovery. The casing assemblies which are used in such a manner, however, are subject to several potentially destructive forces. Very high static internal and external pressure forces are exerted on the casing walls and the couplings when the assemblies are inserted deep into the ground. Each casing is subjected to the axially directed force of the weight of the other casings suspended below it in the casing string. The corrosive effects, the erosive effects, and the pressure forces caused by the steam itself on the internal components of the casing as well as the differential thermal expansion of such components caused by the high temperature of the steam and contamination by downhole fluids can cause structural failure of the casing assembly. Insulated assemblies currently used for transporting fluids of less extreme temperatures cannot be readily adapted for oil well steam injection purposes because of the severe conditions encountered downhole in the well. Conventionally insulated flowtubes leave the insulation susceptible to contamination by downhole fluids causing loss of insulating properties and potential failure of the permanent well casing due to overstressing. Another prior art approach encases the majority of the insulation in a sealed metal jacketing but leaves the joint area completely uninsulated to allow for joint makeup tooling. This uninsulated portion allows high heat transfer locally to the permanent well casing thus producing potential failure stresses in that casing. Another prior art approach encases the entire length with conventional insulation of moderate K-factor but fastens the inner and outer tubular with a high conductivity coupling resulting in excessive heat loss and high temperatures at the outer tubular threads. Early systems have no provision for accommodating thermal expansion of the flowtube which may amount to more than 10 feet in moderate depth wells and present very difficult sealing problems for the bottom hole packer. A previous system accommodated thermal expansion by means of a thin flexible bellows which also sealed the inner to outer pipe insulation annulus (see U.S. Pat. No. 4,130,301).

The necessity for flexibility in the sealing bellows makes it susceptible to physical damage. The accommodation of pipe elongation without a corresponding insulation elongation produces thermal insulation gaps. Elongation of the pipes also produces a variable length coupling cavity which dictates the use of compressible cavity insulation and exposure of the coupling to live steam pressures and temperatures.

A primary objective of the present invention is therefore to provide a new and improved insulating casing assembly for transferring fluids in which elongation due to temperature changes of an inner fluid-carrying section of each casing is restrained by the rigid outer casing. Loads induced in the inner section due to temperature changes are transferred to the outer casing with negligible change in length through an elongated thrust ring which minimizes heat losses through the structural connection.

Another object of the present invention is to provide an insulated casing assembly in which insulation separating the fluid-carrying portion of each casing from the rigid portions is isolated and thus protected from the fluid.

Another object of the present invention is to minimize heat transfer by conduction from the inner pipe to the outer casing through the thrust ring at the coupling area.

Another object of the present invention is to provide a fixed coupling cavity volume which does not vary significantly with temperature or pressure change so that a rigid insulation, capable of withstanding the high temperature and pressure from live steam can be used in the coupling cavity area.

Another objective of the present invention is to provide a primary steam seal on the inner pipe which would effectively prevent egress of the live steam into the coupling cavity and would thus prevent contact of the steam with the casing coupling and coupling cavity insulation.

Another object of the present invention is to provide an insulated casing assembly in which couplings used to join adjacent casings provide a secondary seal which is normally protected from the high temperature fluid by the primary seal ring on the inner pipe assembly.

Another object of the present invention is to provide an insulated casing assembly which insulates along its entire length thus avoiding high heat losses at the coupling area.

Another object of the present invention is to provide an insulated casing with a substantially lower overall thermal conductivity than presently available.

Another object of the present invention is to provide an insulated casing assembly with threaded sections which can be easily repaired without violation of the sealed insulation annulus.

Still another object of the present invention is to provide an insulated casing assembly capable of withstanding radial and longitudinal static and dynamic shipping handling and installation forces without casing assembly failure.

SUMMARY OF THE INVENTION

The present invention, in accordance with one embodiment thereof, comprises an insulated casing assembly including a plurality of insulated casings which, when coupled or strung together, permit fluids of high temperatures and pressures to flow therethrough with low heat loss and without leakage. Each casing comprises radially spaced outer and inner tubular sections defining an annular space therebetween. The annular space is filled with thermal insulating material, preferably a high efficiency multilayered or microsphere insulation, and a filling point in the outer tubular section permits the annular space to be evacuated of air and back-filled with a low conductivity gas to envelop the insulation and thus improve the insulating characteristics of the casing. A fluidtight load bearing thrust ring at each end of the casing, seals the outer and inner tubular sections and transfers the thermal expansion/contraction loads from the inner tubular to the outer tubular section while also protecting the insulation within the annular space from the fluid. Each of the thrust rings is joined to the outer tubular section at a region spaced inwardly from the respective end of the section. Thereby, when two casings are joined, a sealing ring can be fitted over spaced opposing ends of adjacent inner tubular sections to prevent fluid escape into the coupling cavity and to prevent steam migration through the coupling insulation. Additionally, an insulated filler ring is fitted into the coupling cavity to inhibit heat transfer from the inner pipe to the outer casing coupling. A threaded coupling is screwed onto the ends of adjacent casings to rigidly maintain them in a longitudinally coaxial relationship.

DESCRIPTION OF THE PREFERRED EMBODIMENT

Figure 1:
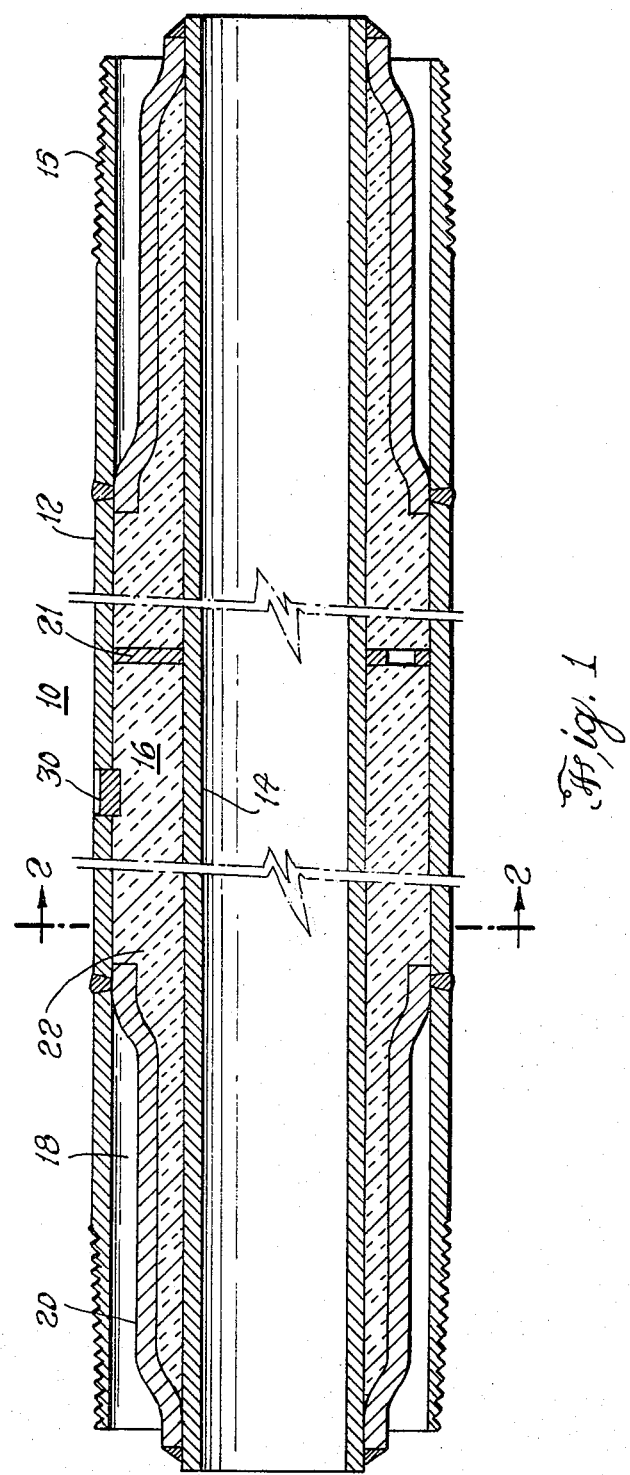
FIG. 1 is a fragmented cross-sectional view of an insulated casing according to the present invention.

Referring now to FIG. 1, there is shown insulated casing 10. Casing 10 can be joined to other insulated casings, in a manner to be described hereinafter, to establish a conduit for transporting fluids, particularly high temperature fluids over long distances with low heat loss and without leakage.

The outer wall of casing 10 is formed by outer tubular section 12. The inner wall of the casing, which forms a flowtube through which fluids flow, is formed by inner tubular section 14. The inner and outer tubular sections are concentric and the radial spacing of the inner and outer section walls is such as to provide annular space 16 therebetween.

The specific material from which the tubular sections are made, as well as its grade and thickness, will vary with the conditions to which the casing is subjected. Several factors must be considered. The tubular sections should be constructed of a material which provides adequate structural support for the casing. When a primary use for the casing is to inject high pressure steam deep into the earth, the material must also be capable of withstanding the effects of excessive pressure, temperature, and corrosion. Further, if the tubular sections undergo welding during manufacturing, a material with a suitable weldability must be selected. Steel alloys of various types are examples of materials suitable for use in forming the tubular sections 12 and 14.

The region in annular space 16 at each end of casing 10 constitutes coupling cavity 18. Within cavity 18 is located fluid-tight thrust ring 20. The purpose of thrust rings 20 is to seal the corresponding ends of the tubular sections while transferring the thermal expansion and contraction induced loads from inner tubular section 14 to outer tubular section 12. The sealing prevents any fluid which enters coupling cavity 18 from entering annular space 16 and prevents back fill gas contained in the annulus from escaping and thereby adversely affecting insulation value of the material therein. To accomplish this, one end of thrust ring 20 is sealingly connected to the inner surface of outer tubular section 12 at a point substantially spaced axially inwardly from the end of section 12 and the other end is similarly connected to the outer surface of inner tubular section 14 near its end.

Thrust ring 20 can be made of any material which is sufficient to withstand the stresses induced by the thermal loading and steam pressure coupled with the downhole corrosive environment. Another consideration for the choice of thrust ring material is that when the casing is used to convey high temperature fluids, particularly steam under pressure, the thrust ring must be able to function properly for numerous thermal cycles despite the adverse effects of such temperature, pressure, load cycles, and corrosion factors.

An example of a suitable thrust ring material when the casings are used for injection of high temperature steam into wells is a corrosion resistant steel such as AISI type 316. For lower temperature conditioned steam, an alloy such as 4130 steel may be satisfactorily substituted.

The shape of the thrust ring should be such as to minimize heat transfer between the hot inner pipe and the cooler outer pipe. As such, the cross-sectional area of the thrust ring should be as small as feasible whilst the length of the ring should be adequate to provide a long thermal path, maximizing the temperature drop along its length.

Thrust rings 20 are connected to the corresponding ends of tubular sections 12 and 14 by means appropriate to the materials of which thrust ring 20 and tubular sections 12 and 14 are made. More specifically, when the thrust ring and tubular sections are made of AISI 4130 steel and API 5A N-80 grade tubing, respectively, connection may be made, for example, by welding the respective ends of the thrust ring to the tubing, by the use of a high strength corrosion resistance filler wire such as G.E. B50A678-B3 chrome-moly steel alloy. Welding of both thrust rings to the inner tubular and of one thrust ring to the outer tubular can be accomplished in a normal shop environment; however, the final closeout weld of the second thrust ring must be made while the inner tubular is elongated to a dimension equivalent to approximately half the nominal expansion which would be expected for an unrestrained inner tubular at maximum operating temperature. This pre-tensioning operation is required to prevent overstressing (in compression) the inner tubular during normal steam startup operation and can be accomplished by performing the final closeout weld while the temperature difference between the inner and outer pipe is approximately half the nominal operational temperature difference or by mechanically stretching the inner tubular. To facilitate making the weld between the second thrust ring 20 and outer tube 12, the threaded end section 15 is not attached until after this weld is made.

The thrust rings can also be connected to the inner and/or outer tubulars by threading the ring and the tubulars. A seal weld to prevent thread leakage is recommended at the steam end of the threads.

The thrust rings are designed to carry the nominal operational thrust loads at worst case temperature differentials with minimal yielding of creep of the material. The thrust ring overlaps the butt weld area of the outer tubular providing an effective backing ring which produces an excellent three-way weld. Repair or replacement of threaded section 15 may be accomplished by cutting the outer tubular at the three-way weld and adding a new threaded section without violating the insulation cavity.

Centralizers 21, which preferably have a plurality of holes therethrough to minimize transfer of heat from inner tubular 14 to outer tubular 12, are spaced at intervals along the length of the inner tubular and are used to help maintain the desired spacing between the inner and outer tubulars.

The remainder of the annular space 16 is filled with a thermal insulating material 22. The appropriate insulating material utilized is determined by the use, by the available annular volume, and particularly by the extremes of temperature, to which the casing assembly is to be subjected. For example, when the casing assembly is to be used to inject steam into a well with a limited cross section, a high efficiency multilayered or multicellular insulation is appropriate.

Figure 2A:
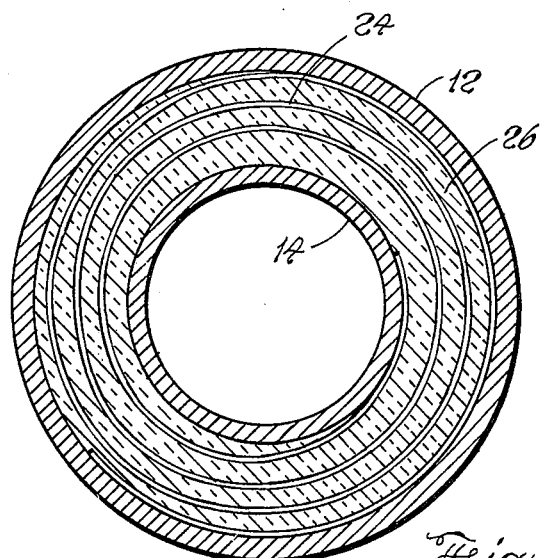
FIG. 2A is a cross-sectional view of an insulated casing incorporating multi-layered insulation within the annular space, taken along lines 2—2 of FIG. 1.
Figure 2B:
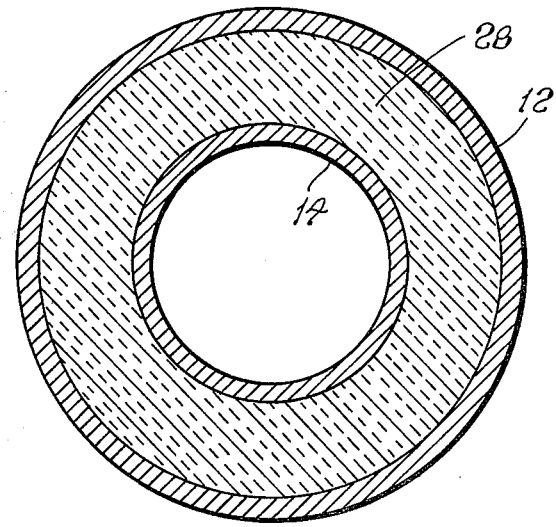
FIG. 2B is a cross-section view of an insulated casing incorporating microsphere insulation within the annular space, taken along lines 2—2 of FIG. 1.

One type of multilayered insulation which is suitable is shown in FIG. 2A and comprises layers of reflective aluminum radiation shields 24 separated by a low conductivity, loose weave, random-oriented, long-fiber fiberglass spacer material 26. FIG. 2B shows a typical multicellular insulation 28 in a low conductivity gas or vacuum environment. However, as was indicated above, any other insulating material can be utilized which possesses the proper thermal insulating qualities required by the use to be made of the casing assembly. The multilayered insulation used can be manufactured in the shape of a tube and inserted into the annular space 16. Alternatively, it can be manufactured into a flat blanket and wrapped around the inner tubular section, overlapping itself sufficiently to negate gap heat loss. Multicellular insulation can be poured and packed in the annulus by conventional methods, or can be fabricated by the use of a binding agent into cylindrical tubes or segments thereof to facilitate assembly procedures.

As an additional insulation measure in the casing 10, a partial vacuum can be effected in the annular space 16 through a filling point 30, FIG. 1, after the insulation is placed therein, and then the annular space is back-filled through the same filling point 30 with a low conductivity gas, selected from the group consisting of argon, krypton, xenon, and combinations thereof. After the back-filling is complete, annular space 16 is hermetically sealed at filling point 30. The gas envelops the insulation within annular space 16 and thereby improves its insulating efficiency.

Figure 3:
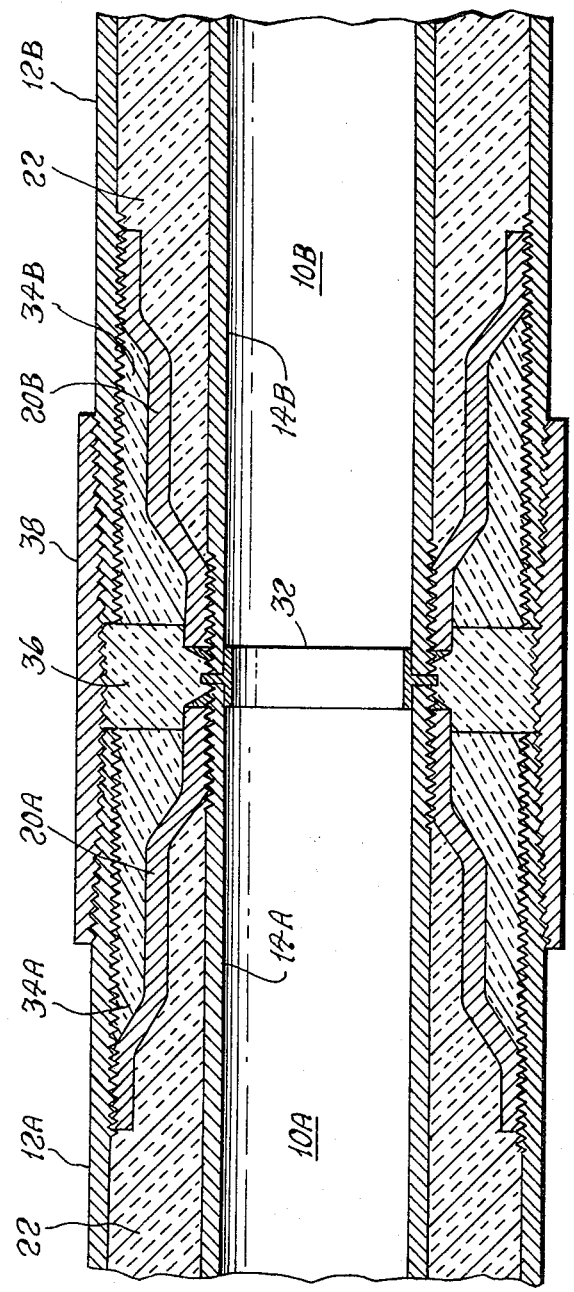
FIG. 3 is a fragmentary cross-sectional view of the insulated casing assembly including two casings and coupling means according to the present invention.

FIG. 3 shows insulated casings 10A and 10B connected together in such a manner that fluid flowing through the inner tubular section of one casing can continue to flow into the inner tubular section of the adjacent casing without leakage. When casings 10A and 10B are properly joined, the ends of the inner tubulars compress seal ring 32 and form a pressure seal which prevents fluid flowing in the inner tubular from entering the coupling cavity. The sealing ring is recessed into the inner tubular inside diameter sufficiently to allow down hole tools to pass unobstructed. The ring is made of an appropriate alloy which can be one of several corrosion resistant materials such as 17-4PH stainless steel or similar. The ring may be sized to seal by compression/crushing between the ends of the inner pipe or by pressure against the inside lip of the inner pipe. When sealing is effected by pressure against the inside lip, the lip must be protected from corrosion and/or oxidation in the elevated temperature environment by an appropriate plating or coating over the exposed steel alloy. A plating such as electrodeposited nickel over hard copper has been successfully used for this application, however a welded overlay of corrosion resistant alloy is equally suitable.

Filler insulation 34A and 34B is fitted over the thrust rings 20A and 20B to minimize heat loss through the coupling cavity area from the thrust rings to the coupling. The filler insulation may be cast in place during assembly with material such as "Fiberfrax LDS moldable" by the Carborundum Company or may be inserted at installation using "Fiberfrax T-30" insulation tubes or similar materials offered by others.

The gap between the coupling cavity insulation 34A and 34B which is left vacant is filled with gap insulation 36. The gap insulation, like the coupling cavity insulation, may be cast in place, using Fiberfrax LDS during manufacture of the casing or it may be field installed using Fiberfrax T-30 tube insulation or Fiberfrax Vaccucast pre-molded insulation. The purpose of gap insulation 36 is to provide a thermal barrier between the inner portion of the tubing and coupling 38. Since seal ring 32 effectively prevents leakage into the gap, the insulation in the gap and the coupling cavities operates at near atmospheric pressure resulting in maximum thermal efficiency for the insulation.

Adjacent casings 10A and 10B are connected by suitable couplings 38 which join by fixed position rather than by torque. Couplings with standard API buttress threads may be satisfactorily used for this application. Once satisfactorily jointed in the proper fixed, longitudinally coaxial, end-to-end relationship, the relative position of the weldments and seal rings remain unchanged during operation.

Two casings, each containing an outer tubular 12, and inner tubular 14, thrust rings 20, centralizers 21, and insulating material 22, 34 and 36 are joined to comprise a completed insulated casing assembly as follows. Thread coupling 38 is screwed onto the threads on the end of outer tubular 12 of a first casing. Seal ring 32 is slipped onto the inner tubular section of the first casing. The second casing is then stabbed into the coupling 38 and the coupling is screwed tightly onto the outer tubular section of the second casing. As a result, the two casings are maintained in a fixed, longitudinally coaxial relationship. In this arrangement, the sealing ring 32 provides a pressure seal between the inner tubulars 14.

It is to be understood that this invention is not limited to the particular embodiment disclosed, and it is intended to cover all modifications coming within the true spirit and scope of this invention as claimed.

We claim:

1. In an insulated casing assembly for conveying a heated fluid, said casing having spaced, concentrically positioned inner and outer tubulars with insulation sealed therebetween, an improved joining arrangement comprising:

a rigid thrust ring joining the inner and outer tubulars at each end of said casing;

said thrust ring joined to said inner tubular near its end and to the outer tubular at a location spaced a substantial distance from its end whereby a long path for heat transfer by conduction from the inner to the outer tubular exists;

the annular space between the outer surface of said thrust ring and the inner surface of said outer tubular constituting a coupling cavity;

coupling cavity insulation contained in said coupling cavity;

said outer tubular having threads at each end;

a threaded coupling ring for joining threaded ends of adjacent outer tubulars;

a seal ring sized to fit within said inner tubular and having a centrally positioned radially outwardly extending rib sized to fit between the ends of adjacent inner tubulars; and a gap insulation ring contoured to fit in the gap between the coupling cavity insulation of similar adjacent casings.

2. An insulated casing assembly in accordance with claim 1 wherein:

the second thrust ring of each casing is secured to join the inner and outer tubulars when the inner tubular is elongated.

3. An insulated casing assembly in accordance with claim 1 wherein:

said thrust rings are welded to or threaded onto said inner and outer tubulars.

4. An insulated casing assembly in accordance with claim 1 wherein:

the space between said inner and outer tubulars contains a gas enveloping said insulation.

5. An insulated casing assembly in accordance with claim 4 wherein:

said insulation comprises alternating layers of reflective aluminum radiation shields and low conductivity, loose weave, random oriented, long-fiber glass fiber material.

6. An insulated casing assembly in accordance with claim 4 wherein:

said insulation comprises glass microspheres.

7. An insulated casing assembly in accordance with claims 5 or 6 wherein:

said gas is from the group consisting of argon, krypton, xenon and combinations thereof.

8. An insulated casing assembly in accordance with claim 1 wherein:

the space between said inner and outer tubulars contains annular centralizers to aid in maintaining the desired distance between said tubulars.

* * * * *